Jan. 6, 1959    R. A. HUNT ET AL    2,867,769
REMOTE INDICATING APPARATUS
Filed Jan. 19, 1953    2 Sheets-Sheet 1
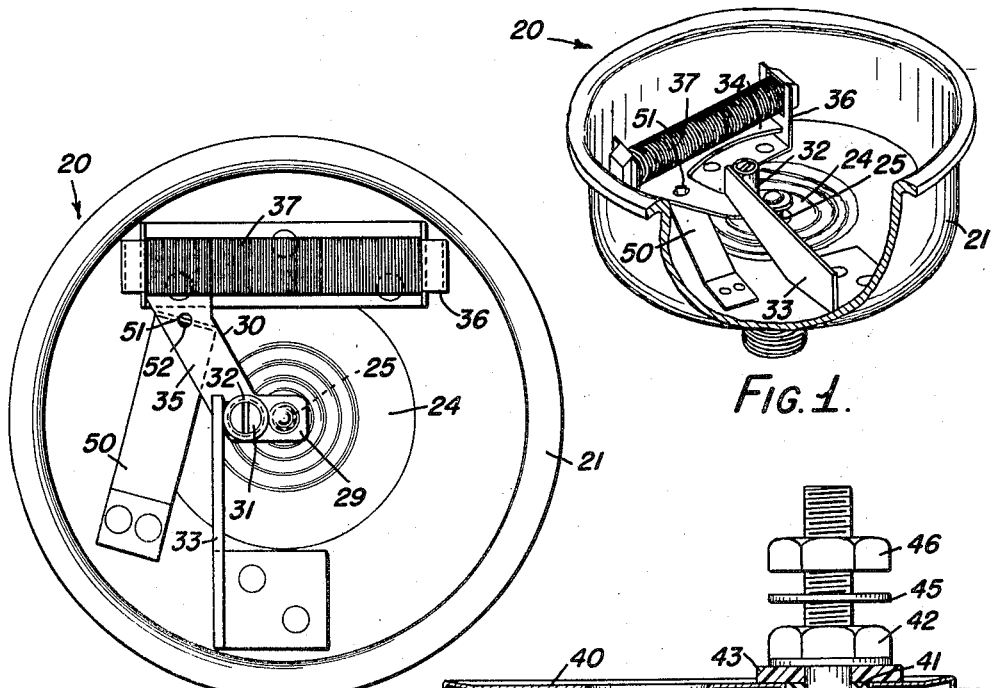
FIG. 1.
FIG. 2.
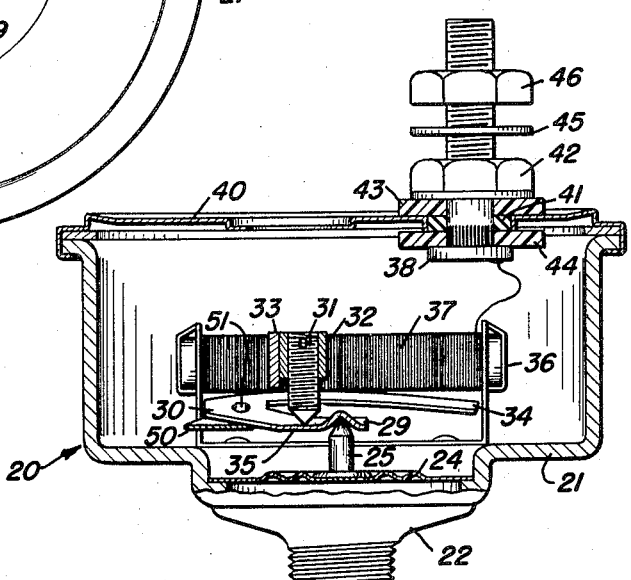
FIG. 3.
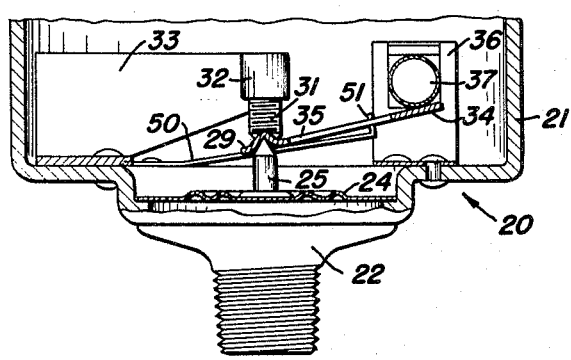
FIG. 4.
INVENTOR.
ROBERT A. HUNT
AUSTIN E. FRIBANCE
BY
*B. E. Shlesinger*
ATTORNEY Jan. 6, 1959   R. A. HUNT ET AL   2,867,769
REMOTE INDICATING APPARATUS
Filed Jan. 19, 1953   2 Sheets-Sheet 2

INVENTOR.
ROBERT A. HUNT
AUSTIN E. FRIBANCE
BY
ATTORNEY

United States Patent Office 2,867,769
Patented Jan. 6, 1959

2,867,769

REMOTE INDICATING APPARATUS

Robert A. Hunt, Penfield, and Austin E. Fribance, Rochester, N. Y., assignors to Rochester Manufacturing Company, Rochester, N. Y., a corporation of New York Application January 19, 1953, Serial No. 332,018

3 Claims. (Cl. 324—146)

The present invention relates to condition-responsive devices, and more particularly to remote indicating gauges and to means for actuating the same. In a more specific aspect, the invention relates to a remote indicating system comprising a condition-responsive variable electric resistance device, and a remote indicating meter or gauge actuated thereby.

Condition-responsive remote indicating devices are known in which the movement of a member in response to change in pressure, temperature, or other condition causes a contact arm to move along an electric resistance coil which is connected in circuit electrically with a meter or gauge that indicates the movement of the arm. In the conventional construction the arm slides over the resistance coil, varying the resistance in the electrical circuit, which variation is indicated by the gauge. When using a slider, however, a compromise must be made in contact pressure. Too much pressure causes jumpy action and excessive lag, and too little pressure results in erratic action if the device is subjected to vibration. Efforts have been made to avoid these defects, but so far as we know, without success.

For ease of construction, it is desirable to use a cylindrical resistance coil in the sender. This gives uniform changes of resistance with equal changes in pressure. The current variation, however, is non-linear because of the inverse relationship defined in Ohm's law. To avoid this, many remote indicating systems use in the transmitter a resistance coil which is tapered. Such a coil is, however, troublesome to make and expensive.

In most electric meters it is necessary to move two coils and achieve a proper balance therebetween in order to calibrate the meter. This is difficult to do. In most meters, too, the effect of gravity on the indicating needle or pointer is great in relation to the torque produced by the current. Hence, the mounting position of the meter is important.

One object of the present invention is to provide a condition-responsive variable electric resistance device that may serve as the transmitter or sender in a remote indicating system and that is substantially friction-free in action, that will permit much greater pressure between the contactor and the resistance coil than has been possible with known variable electric resistance senders, and that will nevertheless operate smoothly and easily with a minimum of lag between up and down readings.

Another object of the invention is to provide a transmitter or sender of the character described for use in a remote indicating system and in which a cylindrical resistance coil may nevertheless be used.

Another object of the invention is to provide a meter or receiver for a remote indicating system which has a long scale for easy reading, which will start quickly, which will have little lag, be simple to calibrate, will be stable despite vibration, which will return to a constant zero point, and which will not be affected by normal variations in supply voltage.

Another object of the invention is to provide a meter or receiver in which a non-linear current response is achieved that is opposite to that of the variable electric resistance sender and which will, therefore, give essentially a linear scale.

Another object of the invention is to provide a gauge or meter having proportional pointer travel even at the lowest end of the scale.

A further object of the invention is to provide a gauge or meter in which the indicator pointer or needle will have equal or greater travel at the lower end of the scale than at the upper end of the scale.

Another object of the invention is to provide a meter or a gauge of the character described which may be calibrated by sliding adjustment of a single actuating coil.

A further object of the invention is to provide an electrically operated meter or gauge in which the torque actuating the indicator needle or pointer is greater than is achieved in conventional electric meters or gauges.

Another object of the invention is to provide an electrically actuated meter or gauge in which the torque produced by the current on the indicator needle or pointer is sufficient that gravity has little effect.

Another object of the invention is to provide an electrically actuated meter or gauge in which the needle or pointer returns to zero by magnetic action, not gravity, when power is shut off.

Another object of the invention is to provide an electrically operated meter or gauge in which the torque actuating the indicating needle or pointer is sufficiently great that the position in which the meter is mounted is not important.

A further object of the invention is to provide an electric meter or gauge in which the torque produced by the current is such that the indicator needle or pointer can be operated on less current than conventional electric meters or gauges so that the sender can be designed to vary the current over a wider ranger while still maintaining the same maximum current, with the result that a scale can be used on the meter or gauge which is much longer than can be used in conventional constructions.

Another object of the invention is to provide a remote indicating system which is relatively insensitive to vibration and which can, therefore, be used with advantage on farm tractors, trucks and similar equipment where conventional remote indicating equipment is not satisfactory.

Still another object of the invention is to provide an electrically actuated meter or gauge which contains about half as many parts as conventional meters and which performs better, and which can be built at less cost than conventional meters.

A still further object of the invention is to provide a remote indicating system made up of a sender and a receiver of the character described which has all the accumulated advantages listed for the two major components plus the additional advantage of being designed and proportioned to work together.

Other objects of the invention will be apparent hereinafter from the specification and from the recital of the appended claims.

In the drawings:

Fig. 1 is a perspective view of a condition-responsive sender constructed according to one embodiment of this invention and adapted to be actuated by changes in pressure;

Fig. 2 is a view of the sender with its cover removed;

Fig. 3 is an axial section through the sender;

Fig. 4 is a fragmentary section taken at right angles to the section of Fig. 3;

Figure 6:
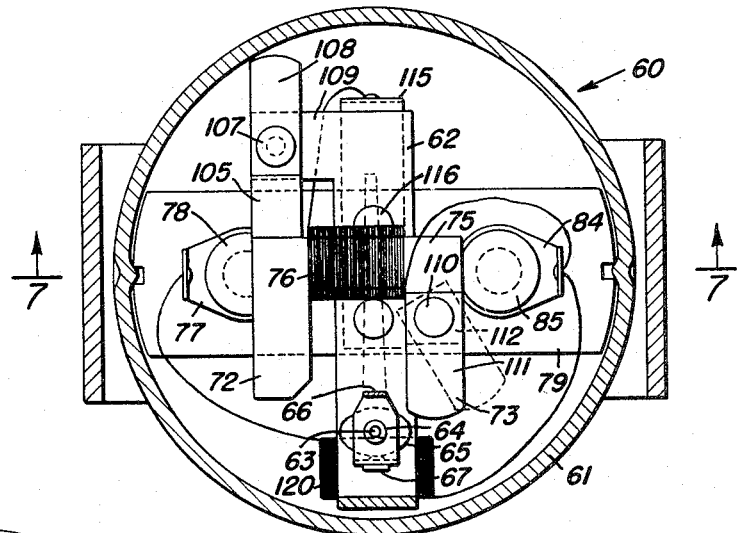
Fig. 6 is a section through this meter taken on the line 6—6 of Fig. 7.

The apparatus of the present invention is shown for use in indicating pressure conditions as, for instance, oil pressure in an automotive engine, pressure in a liquified petroleum gas tank, etc. The apparatus comprises a sender designated as a whole at 20, (Figs. 1 to 4) and a meter or receiver designated as a whole at 60 (Figs. 5 to 8).

The sender is housed in a casing 21 that has a tubular extension 22 which is adapted to be threaded into the container that holds the fluid whose pressure is to be measured. Mounted within the extension 22 is a conventional diaphragm 24 that carries a pin 25. The pin 25 engages the tail portion 29 of a rocker member 30. This rocker member is mounted to rock or pivot about a screw 31 that is adjustably mounted in a bushing 32 which is soldered or otherwise secured to a supporting arm 33 that is riveted or otherwise fastened to the base of the casing 21. The rocker member has an arm 34 projecting substantially at right angles to the body portion 35 of the rocker member and bent to form the rocker portion proper of the member 30.

Riveted in the base of the casing 21 is a generally U-shaped bracket 36 on which is mounted a cylindrical resistance coil 37 comprising a multiplicity of turns of fine wire wound very close together. One end of the wire is soldered to the terminal post 38 which is mounted in the cap 40 of the casing 21. The post 38 passes through a rubber or other insulating disc 41 in this casing and is secured to the cap 40 by a nut 42, and washers 43 and 44, the washers 43 and 44 engaging the cap 40 at opposite sides thereof. The wire leading to the sender is connected to the post 38 by washer 45 and nut 46, the latter threading onto the post. The coil has the insulation removed from one side as by means of a coarse emery cloth, and is coated with an insulating varnish except where the insulation is removed.

The arm 34 of rocker member 30 is adapted to engage and rock over the portion of the coil 37 from which the insulation has been removed. The arm 34 has osculating, rolling, line contact with the coil. It is held spring-pressed into engagement with the coil by a strap spring 50 which is riveted or welded at one end to the base of the casing 21 and at its other end has a teat 51 formed integral with it that engages in a hole 52 in the rocker member 30.

Conventional pressure senders are made, as previously indicated, in which the resistor consists of a coil of resistance wire and resistance is varied by having a slider move along the surface of the coil and make contact at different points. The slider is connected mechanically to a Bourdon tube or a diaphragm which converts pressure variations into mechanical movement. The power available to operate the mechanism is, however, very slight. As a result it is difficult to design a slider which will bear sufficiently hard on the coil to give good contact regardless of vibration, and which at the same time will move freely back and forth without lag. In the mechanism of the present invention this difficulty has been overcome by using rolling action instead of sliding action. We are able to use considerable pressure to hold the rocker on the coil and still get little lag because of the friction-free action. A small movement of the plunger results in a fairly large movement of the rocker arm giving a multiplying action. This is important since the diaphragm in a pressure gauge normally moves only a few thousandths of an inch total travel. Using the rocker action we can get much greater movement of the rocker over the resistor, in fact, in actual practice a multiplication of over forty to one has been attained. In the apparatus of the present invention, the rocker member has a curved arm 34 which rolls along the surface of the cylindrical resistance coil 37. The rocker pivots about the tip of the adjusting screw 31. As the diaphragm pin 25 moves up and down, therefore, the rocker arm rolls along the length of the coil. The spring 50 holds the rocker arm in place and returns it when pressure is released.

The sender device of the present invention has accuracy, lack of lag between up and down readings, stability under vibration, and ease of calibration. Adjustment, which is necessary due to variations in the diaphragm action and in manufacturing tolerances, is quite simple and direct. This makes it possible to calibrate the units so as to make them interchangeable, which is very desirable. Adjustment is made by turning the adjusting screw 31 and by bending the adjusting screw support 33. The screw adjustment determines the starting point of the rocker travel, while changing the lateral distance between the screw and the diaphragm pin 25 by bending the support 33 changes the amount of total travel obtained.

In effect the rocker member 30 is equivalent to a rolling disc pivoted on a point. This permits of getting greatly magnified movement without auxiliary gears, levers, cranks, etc. Furthermore, the rocker or roller type sender has almost friction-free action resulting in very little lag; and it permits using much greater pressure between the resistance coil and the contactor. Because there is no intermediate linkage the action is very smooth and trouble free. In addition, the transmitter or sender is simple and inexpensive to build since it contains so few parts.

The electrical pressure sender 20 is, in effect, a resistor which changes resistance with changes in the pressure being measured. When connected in series with a sensitive electrical meter, such as a milliammeter, which has a suitably graduated scale, it can provide an indication of fluid pressure, temperature, or whatever condition is to be measured. Its chief advantage is that the sending and receiving units may be at some distance from each other, being connected only by a wire.

The receiver or meter of the system is denoted at 60 and comprises a steel casing 61 in which is mounted a bracket 62 (Fig. 8) which is generally U-shaped in cross-section and which has one leg shorter than the other. The legs of this bracket provide bearings for supporting the shaft 63. Secured to this shaft is a bushing 64 on which is mounted a bipolar, preferably oval-shaped, permanent magnet 65 made of a suitable permanently magnetizable alloy. On the bushing 64 is also mounted the indicator pointer or needle 66. Pointer 66 has a downturned tail portion on which is fastened a counterweight 67. The indicating pointer or needle is adapted to read against graduations on a dial 68 which rests on lugs 69 formed internally of the casing 61 by peening the casing inwardly at three or more spaced points. The pointer extends upwardly through an opening in the dial to overhang the dial.

The indicator pointer is adapted to be held normally in zero position, and to be returned to zero position by an electromagnet. This magnet comprises a soft-iron horseshoe-shaped core or pole piece 75 having legs 72 and 73, and a wire coil 76 which is wound around the bar portion 74 of the pole-piece. One end of the wire coil 76 is soldered to a contact spring 115 which serves as a ground by contact with casing 61. This contact spring will be referred to further hereinafter. The other end of the wire coil 76 is connected to a terminal strap 84 which is secured to a terminal stud 85. This stud extends through an opening in the housing 61 but is insulated from the housing by an insulating block or strap 79, and insulating washers 86 and 87. It is secured to the casing by the nut 88 and lock washer 89.

The pole piece 75 is supported from bracket 62 and has a downwardly bent portion 105 integral with it which extends rearwardly from the bar portion 74 (Fig. 8) of the pole piece at one end thereof and in line with the leg 72 of the pole piece. The portion 105 terminates at its rear in a flat portion 106 which is riveted to the bracket 62 by a rivet 107. This same rivet serves to secure a small permanent magnet 108 to the pole piece and to the bracket 62. The pole piece and bracket arm are secured on a laterally projecting extension 109 of the bracket 62.

The pole piece may be made in one piece, but preferably one leg 73 of the pole piece is made in two parts 111 and 112 (Figs. 6 and 7) pivoted together by a rivet 110. The portion 111 of this leg 73 of the pole piece is mounted to pivot on the portion 112 so that the gap between the permanent magnet 65 and the leg 73 of the pole piece can be varied by pivoting the portion 111 about rivet 110, as shown in dotted lines in Fig. 6. Variation in this way of the gap between the opposite poles of the magnet permits of calibration of the meter.

Figures 5, 8:
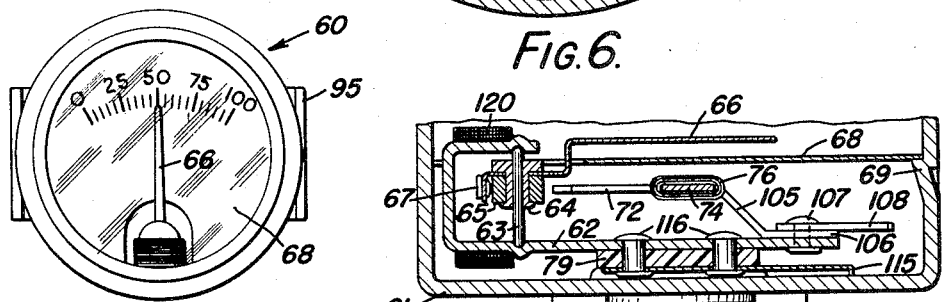
Fig. 5 is a front elevation of the indicating receiver or meter of the system.
Fig. 8 is a section on the line 8—8 of Fig. 7, looking in the direction of the arrows.
Figure 7:
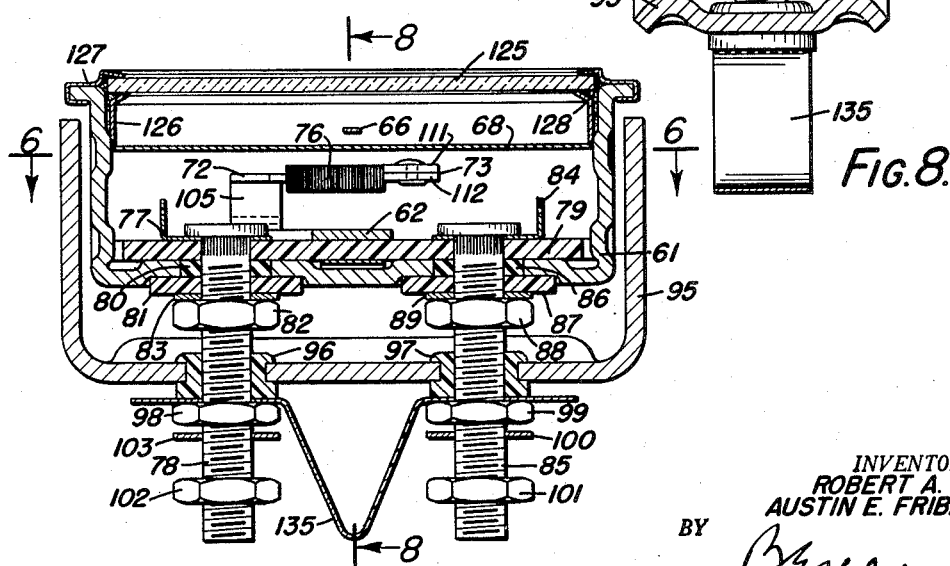
Fig. 7 is a transverse section through the meter taken on the line 7—7 of Fig. 6.

The bracket 62 is riveted to the contact spring 115, which may be made of spring brass or the like, by rivets 116 (Fig. 8). Insulating plate 79 is interposed between the spring 115 and the bracket 62. Spring 115 serves to ground the bracket by contact with casing 61.

For actuating the pointer 66, a wire coil 120 is provided which is slidably mounted on the bracket 62. One end of the coil 120 is soldered to the terminal clip 84, and the other end of the coil is soldered to a terminal clip 77. Terminal clip 77 is secured to a terminal stud 78. This stud extends through an opening in the housing 61 but is insulated from the housing by insulating strap 79 and insulating washers 80 and 81. It is secured to the casing by the nut 82 and lock washer 83.

The terminal studs 78 and 85 may be used to mount the meter in a bracket 95 that may be secured, for instance, on the dashboard of an automotive vehicle. Studs 78 and 85 are insulated from the bracket 95 by spool shaped insulating members 96 and 97.

The terminal stud 38 (Fig. 3) of sender 20 is connected through a wire (not shown) to the terminal post 85 (Fig. 7), this wire being secured to the post 85 by lock washer 100 and nut 101. Terminal stud 78 is connected by a wire (not shown) with one terminal of the ignition switch of the automotive vehicle on which the indicating device is used. This wire is secured to stud 78 by nut 102 and lock washer 103.

When the ignition switch is closed, then, a circuit is made from the battery of the vehicle through the ignition switch, coil 120, coil 37 and back through ground to the battery. The coil 76, being connected to the stud 84 and to spring contact 115, is also energized when the ignition switch of the vehicle is closed.

The casing 61 is closed by a crystal 125 (Fig. 7) which is held against a seating member 126 by a bezel 127. The crystal seats in gasket material 128 that is vulcanized to the bezel.

A piece of insulating material 135, that is secured at one end between spool 96 and a lock-nut 98, and at its other end between spool 97 and a lock-nut 99, is provided to help insulate the support 95 from possible outside electrical contact.

The present invention provides a heavy duty meter suitable even for tractor service where there is considerable vibration. The housing 61 is made of soft steel and is suitable for magnetic shielding. The coil 120, which actuates magnet 65, can be vertically mounted and is current responsive. It is so positioned that the resulting magnetic field created by current flow will be at approximately right angles to the holding coil 76.

The permanent magnetic strip 108 on the receiver or meter affords the zero return of the needle when the current is off. This strip is adjusted about rivet 107 to be as close as possible to the casing 61, and can even bear against the casing 61 so that the casing provides a path of travel for the magnetic lines of force of the rotary magnet 65. The other pole of this rotary magnet has lines of magnetic force through the soft iron pole piece 75 completing the path.

The magnetic return of the meter of the present invention is an important feature since in agricultural machinery the gauge may tip. A gravity return is the usual construction. The meter of the present invention employs a permanent magnet armature which results in much greater torque, with the result that the position in which the meter is mounted is not very important. The meter of the present invention returns to zero by magnetic action, not by gravity. The placing of the actuating coil 120 around the pointer magnet gives a very close linkage of the sender with the receiver.

The meter is calibrated by sliding the actuating coil 120 back and forth with respect to the stem 63 of the pointer 66, that is, with respect to permanent magnet 65. Thus, calibration can be achieved by movement of a single coil, instead of two coils as required in most meters. Adjustment of the return magnet is effected by adjusting parts 111 and 108 (Fig. 6).

In the meter of the present invention, voltage compensation is accomplished by making the holding, or restraining magnet 75 an electro-magnet so that changes in supply voltage affect both the actuating coil 120 and the coil 76 of the electro-magnet in proportion.

With the meter of the present invention it has been possible to attain a scale approximately twice as long as is conventionally used. This is due to the fact that the additional torque achieved in the present meter permits of operating on less current. Hence, the sender can be designed to vary the current over a wider range while still maintaining the same maximum current.

The meter of the present invention contains about half as many parts as comparable meters, yet performs better. Therefore, a better meter can be supplied at less cost.

The meter of the present invention can have a relatively long scale, will start quickly, has little lag, and is easy to calibrate. It is stable under vibration, and the indicator or pointer quickly returns to zero when the current is off. Moreover, it is not affected by normal variations in supply voltage.

The use of a straight cylindrical coil 36 in the sender gives uniform changes of resistance with equal changes of pressure, but the current variation is non-linear according to Ohm's law. In the meter a non-linear current response is achieved which is opposite to that of the sender and which therefore gives essentially a linear scale on the meter. In the meter of the present invention it is possible to expand the first five percent or ten percent of the scale and give equal travel of the needle, equal to the remainder of the scale, or even give the needle for this portion of the scale greater travel than the remainder of the scale. For example, on a meter with one inch travel at sixty pound pressure, it is possible with the present invention to have one-eighth inch travel at five pounds pressure and still have the thirty pound mark at mid-scale. This permits of showing accurately the critical low pressures and of still covering the higher pressures.

The sender and receiver of the present invention are rugged, simple in construction, and relatively inexpensive. They are suitable for truck-tractor installations for indicating oil pressure, water temperature, etc. A remote indicating system made up of a sender and a receiver constructed according to the present invention has all of the accumulated advantages listed for the two major components, plus the additional advantage of being designed and proportioned to work together. The meter or receiver may, however, be used with other type senders, and still provide a better remote indicating system than conventional.

As stated above, while the invention has been illustrated in connection with a device for remote-indication of pressure, it can be used for remote-indication of temperature or other conditions to be measured. While the invention has been described then in connection with a particular embodiment thereof, it will be understood that it is capable of further modification, and this application is intended to cover any variations, uses, or adaptations of the invention following, in general, the principles of the invention, and including such departures from the present disclosure as come within known or customary practice in the art to which the invention pertains, and as fall within the scope of the invention or the limits of the appended claims.

Having thus described our invention, what we claim is:

1. An indicating meter comprising a magnetically-conductive casing, a bracket secured in said casing, a current carrying coil mounted on said bracket, a polarized permanently magnetized armature pivotally mounted in said bracket and movable by said coil about an axis perpendicular to the axis of said coil, a pointer secured to said armature to pivot therewith, a zeroizing horseshoe-shaped electromagnet mounted in operative relation to said armature to have its legs disposed at opposite sides of a plane containing the axis of said armature to influence said armature toward its starting position, the opposite legs of said electromagnet being adjustable relative to one another to vary the influence of said electromagnet on said armature, and a permanent magnet mounted within and in operative relation to said casing and to said armature to urge said armature constantly toward its starting position, means connecting said coil in series with an electric power source and a variable resistor, and means for connecting said electromagnet directly to said power source.

2. An indicating meter comprising a magnetically-conductive casing, a bracket secured in said casing, a polarized permanently magnetized armature pivotally mounted in said bracket, a current-carrying coil mounted on said bracket in operative relation to said armature with its axis extending at an angle to the pivotal axis of said armature, said coil being slidably adjustable toward and from said pivotal axis, a pointer secured to said armature to pivot therewith, a zeroizing horseshoe shaped electromagnet mounted in operative relation to said armature to have its legs disposed at opposite sides of said armature to influence said armature toward its starting position, one of the legs of said electromagnet being made in two parts pivotally adjustable relative to one another about an axis parallel to said pivotal axis to vary the influence of said magnet on said armature, and a permanent magnet secured to one of the legs of said electromagnet in operative relation to said casing to influence said armature constantly to zero position.

3. An indicating meter comprising a magnetically-conductive casing, a bracket secured in said casing, a polarized permanently magnetized armature pivotally mounted in said bracket, a current-carrying coil mounted on said bracket in operative relation to said armature with its axis extending at an angle to the pivotal axis of said armature, said coil being slidably adjustable toward and from said pivotal axis, a pointer secured to said armature to pivot therewith, a zeroizing horseshoe shaped electromagnet mounted in operative relation to said armature to have its legs disposed at opposite sides of said armature to influence said armature toward its starting position, one of the legs of said electromagnet being made in two parts pivotally adjustable relative to one another about an axis parallel to said pivotal axis to vary the influence of said magnet on said armature, a permanent magnet mounted in said casing in operative relation to said armature to influence said armature constantly to zero position, a current-carrying coil wrapped around said electromagnet and having its axis at an angle to the axis of the first coil, means connecting the first-named coil in series with a variable resistor and a source of electrical energy, and means connecting the second-named coil to the same source of electrical energy.

References Cited in the file of this patent

UNITED STATES PATENTS

| | | |
|---|---|---|
| 1,220,587 | Beede | Mar. 27, 1917 |
| 1,398,595 | Hoyt | Nov. 29, 1921 |
| 1,657,910 | Allen | Jan. 21, 1928 |
| 1,992,780 | Skeats | Feb. 26, 1935 |
| 2,102,409 | Faus | Dec. 14, 1937 |
| 2,338,694 | Lingel | Jan. 4, 1944 |
| 2,339,021 | Lingel | Jan. 11, 1944 |
| 2,428,229 | Kelly | Sept. 30, 1947 |
| 2,446,431 | Pfeffer | Aug. 3, 1948 |
| 2,510,785 | Potts et al. | June 6, 1950 |
| 2,525,095 | Coxon et al. | Oct. 10, 1950 |
| 2,668,945 | Pfeffer | Feb. 9, 1954 |